United States Patent Office 3,455,003
Patented July 15, 1969

3,455,003
WATER TRANSFER MEMBER
William H. Wood, Rockbridge, Ohio, assignor to Harris Intertype Corporation, Cleveland, Ohio, a corporation of Delaware
No Drawing. Continuation of application Ser. No. 221,864, Sept. 6, 1962. This application July 25, 1966, Ser. No. 567,360
Int. Cl. B21b 27/02; B41l 23/00, 25/00
U.S. Cl. 29—132                    18 Claims

ABSTRACT OF THE DISCLOSURE

A water transfer member having a hydrophilic surface layer which is adapted to effect water transfer and a method of making such a water transfer member. The hydrophilic surface of such member is formed from a material which, prior to formation into the surface layer, is a water-insoluble polymeric ion exchange resin which may be either an organic polymeric cationic resin or a water-attractive, non-cellulosic anionic exchange amine resin.

The present invention relates to an improved water-transfer member and, more particularly, to a supporting body having the water-attractive properties of a surface enhanced by the presence of a polymeric ion-exchange resin. Such a body may comprise a roller or the like especially adapted for lithographic applications.

This application is a continuation of Ser. No. 221,864, filed Sept. 6, 1962, which is a continuation-in-part of Ser. No. 257,949, filed Nov. 23, 1951, and Ser. No. 614,097, filed Oct. 5, 1956, all now abandoned.

In lithographic printing presses, the dampening means constitute an important feature of the press. Such means ordinarily includes a water fountain or pan with pan roller, a dampening roller operating on the planographic plate, and in most presses one or more intermediate rollers between the pan roller and the plate-contacting roller. These rollers are subjected to wear and deterioration. The construction thereof has generally involved metal cores covered with felted cotton or molleton. In some instances all metal rollers have been employed. The limitations in both have been the reduction in water-carrying ability and the general tendency to wear undesirably rapidly and, in the case of metal rollers, the additional factor fo undesirable corrosion. By the present invention, the construction of a water-transfer member, such as a roller, etc. for lithographic printing, may be provided having outstanding water-carrying capacity. A particularly durable form of surface results.

It is, therefore, a principal object to provide an improved water-transfer memebr.

Another object is to provide a roller, blanket, and the like for lithographic printing applications having at a a surface thereof designed to effect transfer of water a polymeric ion-exchange resin enhancing the water-attractive qualities.

A further object is to provide such a roller, etc., in which cationic and anionic-exchange resins may be employed.

Other objects of the invention will become apparent as the description proceeds.

To the accomplishment of the foregoing and related ends, the invention consists of the features hereinafter fully described and particularly pointed out in the claims, the following disclosure describing in detail the invention, such disclosure illustrating, however, but one or more of the various ways in which the invention may be practiced.

The invention contemplates the production of a water-transfer member having enhanced hydrophilic properties which are sharply discriminative against fatty acid materials such as, for example, are found in printing inks. Such a water-transfer member is prepared so as to contain at least at a surface intended to transfer the water, a polymeric ion-exchange resin. Both cationic and anionic-exchange resins are usable. Cationic resins within the contemplation of the invention are organic water-attractive cationic-exchange polymers having reactive acid groups. The preferred acid groups include carboxyl, sulfonic, and phosphoric acid groups. Anionic-exchange resins within the contemplation of the invention are the so-called amine resins, that is, non-cellulosic anionic-exchange amine resins having nitrogen-containing basic groups. For the present purpose, cationic-exchange resins are preferred since these resins may be safely used in the environment of a printing press to contact without reaction either the usual printing inks, which contain fatty acids, or the more recently developed so-called heat-set inks which do not contain fatty acids. However, the anionic-exchange resins although also water-loving do react with fatty acids. To prevent this reaction in the present water-transfer members, the anionic-exchange resins are treated with a water-soluble acid reactive with the nitrogen-containing groups on such resins to forestall any reaction between the same groups and the fatty acids which may be present in a printing ink, as hereinafter more fully described.

Many cationic and anionic-exchange resins meeting the foregoing descriptions are known in the art, although the novel applications as herein described and claimed have not been suggested. In this regard, it is emphasized that although the terms "cationic-exchange" and "anionic-exchange" correctly describe and indicate the resins contemplated, these resins in the present water-transfer members do not perform an ion-exchange function in the manner such resins were heretofore employed by the prior art, such as to remove metal ions from a solution. Rather the defined resins are used in water-transfer members because of the water-attractiveness imparted thereto. Indeed, the present ion-exchange resins cannot pick up metal ions of a fountain solution used in a printing press by ion-exchange because of the acid pH of such solution and therefore the resins remain water-retentive.

Because of the vast number of cationic and anionic-exchange resins which may be employed, it is not practical nor, in fact, necessary to categorize the nature of the residue or bulk of the ion-exchange resins, since in any event it is the acid groups and the nitrogen-containing basic groups (alone or acid-treated as described) of, respectively, the cationic and anionic-exchange resins which so enhance the water-carrying and hydrophilic qualities of the present water-transfer members. In view of the very large number and varying chemical structures of ion-exchange resins which satisfy the foregoing general descriptions and which may accordingly be used in practicing the present invention, reference is made for the purposes of the present disclosure to exemplary prior art patents which illustrate more specifically the nature of certain ion-exchange polymers and methods of preparing them.

CATIONIC-EXCHANGE RESINS

In general, the cationic-exchange resins which may be employed are water-attractive organic polymers having reactive acid groups, which preferably are carboxylic, sulfonic, or phosphoric acid groups. These polymers are also substantially chemically inert except for the defined acid groups. A desired class of cationic-exchange resins constitutes the aryl polymers and especially those in which the acid groups are nuclear with respect to the aromatic chain of the condensation product. An example of such a resin is the condensation product of phenol and an aldehyde having acid groups nuclear with respect to the benzene ring. Polyvinyl aryl condensation products containing acid groups are very satisfactory as the cation-exchange resins.

Specific cationic-exchange resins which may be used include sulfonated polystyrene, chlorosulfonated polyethylene, cross-linked water insoluble polyacrylic acid, acrylic acid-divinyl benzene polymers, acrylic acid triallyl-cyanurate copolymers, partially hydrolyzed polymethyl methacrylate, hydrolyzed acrylonitrile-vinyl chloride polymers, hydrolyzed acrylonitrile-vinyl acetate polymers, hydrolyzed polymethacrylate cyanide polymers and hydrolyzed acrylonitrile-styrene polymers, it being noted that hydrolyzing where indicated provides carboxyl groups.

The following United States patents illustrate the foregoing and exemplify still other types of cationic-exchange resins which may be employed.

Patent 2,191,853 discloses a cationic synthetic resin of the monohydric and polyhydric phenol-formaldehyde type which is sulfited, for example, by the action of sulfur dioxide, sulfurous acid or sulfites.

Patent 2,204,539 in particular discloses the formation of cationic-exchange resins containing nuclear sulfonic acid radicals in their molecule. Such compounds can be produced either from materials which already contain sulfonic acid radicals (such as hydroxybenzene-, naphthalene, acenaphthene-, or phenanthrene-sulfonic acids), of the resins obtained in the normal way may be after treated with sulfonating agents. In the first case, the aromatic sulfonic acids should be easily condensed with aldehydes. For subsequent sulfonation of resins free of sulfonic groups, those products are chosen which yield difficultly soluble or insoluble sulfonation products. In one example given, hydroxybenzene sulfonic acid is reacted with a solution of formaldehyde.

Patent 2,228,160 also discloses condensation products produced by reacting an aldehyde with hydroxybenzene. The cationic-exchange resins of this patent are produced from monohydroxy-benzene, homologous compounds, or its alkali metal salts, by introducing acid groups into the molecule by means of a treatment with sulfites, bisulfites, or sulfur dioxide. According to the teachings, the condensation and acidification are carried out under such conditions that water-insoluble products are formed.

Patent 2,340,110 discloses an infusible, insoluble cationic copolymer containing carboxyl groups. In particular, the copolymers are produced from a polymerizable mixture comprising (1) at least one polymerizable compound containing a polymerizable $$CH_2=C<$$

grouping and at least one other polymerizable grouping, the unsaturated bonds of said polymerizable groupings being non-conjugated with respect to each other, (2) styrene and (3) maleic anhydride, there being at least one mol of styrene for each mol of maleic anhydride present in the polymerizable mixture.

Any suitable method may be used in preparing the insoluble, infusible copolymers. For example, the components may be mixed and polymerized in the presence or absence of a solvent or a dispersion medium for the components by the use of heat, light, or heat and light in the presence or absense of a polymerization catalyst, at atmospheric, subatmospheric or superatmospheric pressure.

Patent 2,340,111 also discloses an infusible, insoluble cationic copolymer containing carboxyl groups. These copolymers are produced from a polymerizable mixture comprising (1) at least one polymerizable compound containing a polymerizable $$CH_2=C<$$

grouping and at least one other polymerizable grouping, the unsaturated bonds of the said polymerizable groupings being non-conjugated with respect to each other, and (2) at least one acrylic acid having the structural formula $$CH_2=C-COOH$$
$$\phantom{CH_2=C-}|$$
$$\phantom{CH_2=C-}R$$

where R is a substituent selected from the class consisting of hydrogen, chlorine, bromine, monovalent alkyl radicals, monovalent aralkyl radicals, monovalent aryl radicals and monovalent alkaryl radicals. The copolymers may be prepared in the same manner described for Patent 2,340,110.

Patent 2,366,007 discloses compositions of matter comprising sulfonated, cross-linked, insoluble, infusible polymerizates of polyvinyl aryl compounds. The polymerization may be made by polymerizing a polyvinyl aryl compound alone, copolymerizing a plurality of polyvinyl aryl compounds, copolymerizing at least one polyvinyl aryl compound with at least one monovinyl aryl compound copolymerizing a mixture of polymerizable compounds, the major portion of the polymerizable compounds being either at least one polyvinyl aryl compound or at least one polyvinyl aryl compound and at least one monovinyl aryl compound. Illustrative examples of suitable polyvinyl aryl compounds which may be used are:

Divinyl benzenes
Divinyl toluenes
Divinyl naphthalenes
Divinyl xylenes
Divinyl ethyl benzenes
Divinyl chlorobenzenes
Divinyl-phenyl vinyl ethers Illustrative examples of suitable monovinyl aryl compounds which may be used are:

Styrene (vinyl benzene)
Vinyl toluenes
Vinyl naphthalenes
Vinyl ethyl benzenes
Alpha-methyl styrene
Vinyl chlorobenzenes
Vinyl xylenes.

After polymerization is complete, the product is isolated and ground to a granular form. This product is then sulfonated by the use of known sulfonating agents, for example, concentrated sulfuric acid, fuming sulfuric acid, chlorosulfonic acid, etc.

Patent 2,440,669 discloses resinifying a mixture including at least one aldehyde selected from the group consisting of formaldehyde and furfural and a sulfonated compound having the following general formula:

$$R_1-CH-CHRX$$
$$\phantom{R_1-CH-}|$$
$$\phantom{R_1-CH-}SO_3M$$

in which $R_1$ is a hydroxyaromatic radical of the benzene series, X is an activating group possessing a polar bond selected from the group consisting of —CO-aliphatic, —CO-aromatic, —CO-aliphatic-aromatic, —COOR, —CN, and —NO$_2$, M is selected from the group consisting of metals, hydrogen and H·NR$_2$R$_3$R$_4$, and R, R$_2$, R$_3$, and R$_4$ are selected from the group consisting of hydrogen and organic radicals. To prepare such resins, for example, a hydroxy benzaldehyde is condensed with a substance containing a nactive methyl group or an active methylene group and converting the resulting condensation product into a sulfonate by reaction with a bisulfite.

Patent 2,597,437 discloses cationic-exchange resins of the carboxylic type, proliferous cross-linked polyacrylic acid. These resins are prepared by polymerizing acrylic acid or an ester of acrylic acid and then hydrolyzing the polymeric ester.

Patent 2,597,438 discloses insoluble cationic-exchange resins of the sulfonic type. These resins are sulfonated polymers of styrene and are most conveniently made by sulfonating polystyrene directly by such sulfonating agents as sulfuric acid.

ANIONIC-EXCHANGE RESINS

In general, the anionic-exchange resins employed are the water-attractive organic, so-called amine resins which have nitrogen-containing basic groups. These resins are produced for example, by condensing aromatic amines with formaldehyde. The nitrogen-containing basic groups of such resins may comprise such groups as $-NH_2$, $-NHR$, $-NR_2$, $-NR_3{}^+$ $OH^-$ in which R is an organic radical, either aliphatic or aryl having up to and including ten carbon atoms, the aryl radicals, of course, having from 6 to 10 carbon atoms. Both aliphatic and aryl substituents may be present in the same basic group. The quaternary ammonium basic groups are preferred because they usually have the strongest basicity.

Specific anionic-exchange amine resins which may be used include copolymers of styrene and vinyl pyridine, polyvinyl pyridine, polystyrene containing primary, secondary, or tertiary amino groups, and quaternary ammonium hydroxide groups like those just mentioned in the immediately preceding paragraph, polymethylene polyamine polymers, polyethylene polyamine polymers, polypropylene polyamine polymers, polybutylene polyamine polymers, pheno-formaldehyde polyamine polymers, melamine-guanidine formaldehyde polyamine polymers, guanidine-formaldehyde polyamine polymers, carboxy methylene phenylamine diamine, and the like.

For example, an anionic-exchange resin can be prepared from polystyrene by reacting the polystyrene with chloromethylmethyl ether ($ClCH_2OCH_3$) in the presence of aluminum chloride to introduce one or more chloromethyl groups onto the benzene ring and then reacting with ammonia or an amine to replace the chlorine by an amino group. Reaction with a tertiary amine gives a quaternary ammonium chloride which can be converted to a quaternary ammonium hydroxide by treatment with a base.

The following United States Patents illustrate the foregoing and exemplify still other types of anionic-exchange resins which may be employed.

Patent 2,106,486 discloses condensing m-phenylenediamine with formaldehyde in an acid medium and under such conditions as disclosed to yield a final resinous gel.

Patent 2,246,526 discloses condensing an aldehyde in the presence of a suitable condensing agent with an aryl polyamine derivative which has at least one free amino group and at least one amino group protected from reaction with the aldehyde. After the condensation has been effected, the amino-protecting group is then split off from the condensation product, such as by hydrolysis, to produce a condensation product having at least one free aryl amino group in the molecule.

Patent 2,402,384 discloses nitrogenous resins which are formed by the condensation of a phenol, formaldehyde, and an alkylene polyamine, the alkylene group of which may be interrupted by —NH— to form alkylene chains of at least two carbon atoms between nitrogen atoms. Heating is carried out for a sufficient time to render the resulting resin insoluble in strong dilute acids. The polyamines which may be used in this case as well as in general in the preparation of amine resins include the alkylene polyamines such as ethylene diamine, diethylene triamine, triethylene tetramine, tetraethylene pentamine, N,N'-bis-(aminopropyl)ethylene diamine, dipropylene triamine, tris(trimethylene) tetramine, and other polyalkylene polyamines.

Patent 2,442,989 discloses direct condensation of a polyalkylene-polyamine with an aldehyde and a ketone or other substance containing labile hydrogens. This process saves the cost of using acid to neutralize the amine of the alkali needed to neutralize the acid in the final product and enables preparation of the resins without extensive heating. The free polyalkylene-polyamine is simply mixed with the other ingredients in suitable proportions to form a gel.

Patent 2,467,523 discloses the preparation of an anionic-exchange resin by bringing together a polyalkylene-polyamine and a substituted 1,3,5-triazine containing at least two functional groups such as $-NH_2$, $-OH$, $-SH$, $-O$ alkyl, $-Cl$, $-Br$, $-S$ alkyl, etc.

Patent 2,469,683 discloses condensing an alpha-chlorobeta, gamma-epoxy organic compound, for example, epichlorohydrin with an alkylene polyamine in the form of the free base, by bringing them together in a molar ratio of at least 2:1, respectively.

Patent 2,469,693 discloses condensing an aliphatic polyhalide which contains a hydroxy group in beta position to each of the halogens with an alkylene polyamine. The resulting condensation product is permitted to gel after which the gel is cured by heating and the cured product then granulated.

Patent 2,469,684 discloses condensing a polyepoxy organic compound, for example, bis-(2,3-epoxypropyl) sulfide, with an alkylene polyamine. The condensation product is permitted to gel as previously, after which the gel is cured by heating and then granulated.

Patent 2,473,498 discloses reacting a polyalkylene polyamine, acrylonitrile, and an ammonocarbonic acid, such as cyanamide, dicyandiamide, a guanidine, a biguanide, etc., to form an anionic-exchange resin. The reaction product may be granulated as before.

Patent 2,518,956 discloses reacting a polyalkylene polyamine, an aldehyde and a nitroalkane containing at least two labile hydrogen atoms capable of reacting with formaldehyde to form methylol compounds. The free polyalkylene polyamine is simply mixed with the other ingredients in suitable proportions to form a gel. Extensive heating is unnecessary since the reaction is exothermic.

Patent 2,521,664 discloses condensing a polyamine with an aldehyde and insolubilizing the resulting product with an aminotriazine-aldehyde condensation product, for example, a melamine-formaldehyde condensation product.

Patent 2,522,668 discloses condensing a guanidine or a biguanide with a reactive ketone, insolubilizing the resulting condensation product with an aldehyde and urea or an aminotriazine.

Patent 2,525,227 discloses producing as a gel an anionic-exchange resin by gelling the condensation product of a substance containing a guanido group such as guanidine nitrate with a condensation product of an amino compound such as melamine or urea and an aldehyde such as formaldehyde in the presence of a definite excess of water.

Patent 2,525,480 discloses condensing an aldehyde with a furyl substituted aliphatic amine, permitting the condensation product to gel, curing the gel by heating, and granulating the cured gel.

Patent 2,529,142 discloses reacting an aminotriazine, an aldehyde, and a strongly basic, non-aromatic amine, acidifying the reaction product to a pH of from 2 to 4, drying the acidified product by heating, and granulating the heated, dried product.

Patent 2,531,863 discloses reacting an aldehyde-reactive phenolic compound with an aldehyde and a nitroparaffin and then reducing the nitro groups to amino groups. Patent 2,553,386 is similar except that an aldehyde-reactive amino compound is used in place of the phenolic compound.

Patent 2,540,984 discloses copolymerizing a polyvinyl derivative of an aromatic compound, such as divinyl benzene, with a monovinyl derivative of a nitrogen-containing heterocyclic compound, such as vinyl pyridine.

Patent 2,540,985 discloses the quaternary ammonium type of anionic-exchange resin in which the resins are quaternary ammonium derivatives of copolymers of vinyl pyridine and divinyl benzene or trivinyl benzene. Processes of preparing these compounds are also disclosed.

Patent 2,570,822 discloses preparing an anionic-exchange material by the treatment of an organic or resinous material which contains secondary amino groups with an alpha:beta unsaturated aldehyde or ketone and with an aliphatic halogen compound.

Patent 2,591,753 discloses the reaction products of a tertiary amine and an insoluble, cross-linked copolymer of an aromatic monovinyl hydrocarbon and an aromatic divinyl hydrocarbon, which copolymer contains haloalkyl groups having the formula—$C_nH_{2n}X$ in which X is a chlorine or bromine atom and —$C_nH_{2n}$ is an alkylene group in which $n$ is an integer from one to four. The resins are, therefore, insoluble, aromatic, cross-linked vinyl copolymers containing substituent groups having the general formula

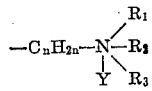

in which $n$ is an integer of value one to four; $R_1$, $R_2$, and $R_3$ are hydrocarbon groups; and Y is an anion, such as a chloride, sulfate or hydroxyl ion. It will be noted that these reaction products are of the quaternary ammonium type.

PREPARATION OF WATER-TRANSFER MEMBER

For purposes of illustration, the preparation of a roller, such as a dampening roller for a lithographic press, is described although it is understood that the present ionic-exchange resins may be used on any support member of which it is desired to enhance the hydrophilic, water-loving, or water-retentive qualities of any desired area.

In general, the ion-exchange resins may constitute the entire roller, or be molded over a supporting body, or be admixed with a compatible material, as long as a sufficient amount of the ion-exchange resin appears at a desired exposed surface, or portion thereof, to improve those hydrophilic properties in a manner described. In forming rollers, the known techniques of molding may be followed. It will be noted that certain of the cited patents refer to forming the resin in a granular form, and the resins are conveniently used in this comminuted state. For example, the resins may be molded in a desired form and then completely cured by the application of heat and pressure. The presence of fillers, plasticizers, cross-linking agents, and the like, are also contemplated to control the ultimate properties of the product such as softness or hardness. Such properties can also be controlled by proper selection of curing conditions such as temperature, pressure and length of cure, as is known in the art. As indicated, the resins may be molded onto a shaft or arbor, or in the case of small rolls a one piece construction may be formed comprising a polymeric material without a metal shaft.

In some cases, if desired, the fully polymerized ion-exchange resin may be pulverized and dispersed in a carrier material which is hydrophilic and water-insoluble, such as a copolymer of trichlorosilane and acrylic acid, or the like. On drying the carrier, a sufficient amount of the ion-exchange resin forms at a finished surface.

As indicated, the cationic-exchange resins with their acid groups are immediately usable to transmit or retain water, such as in lithographic applications, regardless of whether or not inks containing fatty acids are employed. Anionic-exchange resins can similarly be used immediately if heat-set inks or other inks not containing fatty acids are to be used. If, however, use of a fatty acid ink is contemplated, it is necessary to treat the anionic-exchange resins with a water-soluble acid. Any water-soluble acid that reacts with the basic nitrogen-containing groups of the anionic-exchange resins and cannot be displaced by fatty acids may be used. Concentration of the water-soluble acid may range, for example, from about 0.1 percent to about 5 percent by weight in aqueous solutions. There are many such water-soluble acids meeting the indicated requirements, such as gluconic acid, hydroxyacetic acid, polyacrylic acid, phosphoric acid, nitric acid, chromic acid, and the like. Conveniently, an acid that is used normally in a fountain solution of a printing press suffices and also serves to keep a roller of an anionic-exchange resin continuously flooded with an acidic medium.

In all cases, the resulting surface on the water-transfer member is hydrophilic and highly durable in service. In contrast, in previously known dampening rollers, the water solution was carried merely to the extent of a mechanically held film, there being no particular attracting force on such a surface. A roller or like object made in accordance with the present invention has a surface in which the acid radicals, or the nitrogen-containing basic groups, or such groups acid-treated, as described for the various ion-exchange resins, are definitely active to attract and retain effectively a film of water.

In order to demonstrate the invention, the following examples are set forth for the purpose of illustration only. Any specific enumeration or detail mentioned should not be interpreted as a limitation of the invention unless specified as such in one or more of the appended claims and then only in such claim or claims.

Example 1

Acrylic acid and divinyl benzene were mixed in a molar ratio of 10:1, respectively, and heated at a temperature within the range of about 75° C. to about 100° C. for a time to produce a partially polymerized copolymer still sufficiently plastic to undergo a molding operation. The copolymer was then molded into the form of a roller about a steel arbor using apparatus of the type disclosed in United States Patent No. 2,536,323. Upon being released from the mold, the resulting roller was ready for immediate installation in a printing press.

Example 2

A roller was formed entirely from acrylic acid-tir-allyl cyanurate copolymer. Since this resin was of the cationic-exchange type, it could be directly installed, that is, without an acid treatment, in the train of a printing press regardless of the type of ink which may be used with the press.

Any of the previously disclosed cationic and anionic-exchange resins may be substituted for those of the examples, the techniques and uses of the resulting products being the same in accordance with the foregoing disclosure. All patents previously cited are hereby incorporated by reference.

Other forms embodying the features of the invention may be employed, change being made as regards the features herein disclosed, provided those stated by any of the following claims or the equivalent of such features be employed.

I therefore particularly point out and distinctly claim as my invention:

1. A dampening roller for lithographic printing having at least a surface layer consisting essentially of a water-attractive non-cellulosic ion-exchange synthetic polymeric resin having acid groups, said polymer being selected from the group consisting of sulfonated polystyrene, chlorosulfonated polyethylene, and a copolymer of acrylic acid and divinyl benzene, said acid groups imparting ion-exchange properties to said roller and enhancing the hydrophilic and oleophobic qualities thereof.

2. A dampening roller for lithographic printing having at least a surface layer comprising a water-attractive non-cellulosic ion-exchange synthetic polymeric resin consisting essentially of a copolymer of acrylic acid and divinyl benzene.

3. A dampening roller for lithographic printing having at least a surface layer consisting essentially of a waterattracticve product obtained by treating a synthetic non-cellulosic anionic-exchange amine resin having nitrogen-containig basic groups with a water-soluble acid reactive with such nitrogen-containing groups.

4. A dampening roller for lithographic printing comprising a cylindrical body consisting of a molded water-attractive, synthetic non-cellulosic polymeric resin having at least the exposed surface thereof treated with a water-soluble acid to impart a hydrophilic character to said roller, said molded polymeric resin being selected from the group consisting a copolymer of styrene and vinyl pyridine, and polyvinyl pyridine.

5. A dampening roller for lithographic printing comprising a cylindrical body consisting essentially of a synthetic non-cellulosic polymeric resin selected from the group consisting of a copolymer of styrene and vinyl pyridine, and polyvinyl pyridine, said cylindrical body having at least a surface layer consisting essentially of a water-attractive product obtained by treating said non-cellulosic polymeric resin with an acid selected from the group consisting of polyacrylic, arabic, phosphoric, and chromic acids.

6. A method of providing an improved dampening roller for lithographic printing comprising forming at least on the surface of a roller a layer consisting essentially of a water-attractive non-cellulosic ion-exchange synthetic polymeric resin having acid groups, said polymer being selected from the group consisting of sulfonated polystyrene, chlorosulfonated polyethylene, and a copolymer of acrylic acid and divinyl benzene, said acid groups imparting ion-exchange properties to such roller and enhancing the hydrophilic and oleophobic qualities thereof.

7. A method of providing an improved dampening roller for lithographic printing comprising forming at least on the surface of a roller a layer consisting essentially of a water-attractive non-cellulosic ion-exchange synthetic polymeric resin consisting essentially of a copolymer of acrylic acid and divinyl benzene.

8. A method of improving the water-attractive qualities of a dampening roller for lithographic printing comprising forming at a surface layer on such roller of a synthetic non-cellulosic anionic-exchange amine resin having nitrogen-containing basic groups, and then treating such surface layer with a water-soluble acid reactive fwith such nitrogen-containing groups effective to impart a hydrophilic character to such surface layer.

9. A method of providing an improved dampening roller for lithographic printing comprising molding in a cylindrically-shaped body a synthetic non-cellulosic polymeric resin selected from the group consisting of a copolymer of styrene and vinyl pyridine, and polyvinyl pyridine, and then treating such polymeric resin with a water-soluble acid to impart a hydrophilic character to such roller.

10. A method of providing an improved dampening roller for lithographic printing comprising molding in a cylindrically-shaped body a synthetic non-cellulosic polymeric resin selected from the group consisting of a copolymer of styrene and vinyl pyridine, and polyvinyl pyridine, and then treating such polymeric resin with an acid selected from the group consisting of polyacrylic, arabic, phosphoric, and chromic acids to impart a hydrophilic character to such roller.

11. A water transfer member comprising a supporting body having a hydrophilic surface layer adapted to effect such water transfer, said hydrophilic surface layer comprising in sufficient amount to enhance the hydrophilic and oleophobic qualities of the outer surface of said layer a material which, prior to formation as said surface layer, is a water-insoluble polymeric ion exchange resin selected from the group consisting of organic polymeric cationic resins having reactive acid groups and a water attractive non-cellulosic anionic exchange amine resin having nitrogen containing basic groups selected from the class consisting of $NH_2$, NHR, $NR_2$ and $NR_3OH$ wherein R is an organic radical selected from the group consisting of aliphatic radicals having from 1 to 10 carbon atoms and aryl radicals having from 6 to 10 carbon atoms.

12. A water transfer member comprising a supporting body having a hydrophilic surface layer adapted to effect such water transfer, said hydrophilic surface layer comprising in sufficient amount to enhance the hydrophilic and oleophobic qualities of the outer surface of said layer a material which, prior to formation as said surface layer, is a water-insoluble polymeric non-cellulosic anionic exchange amine resin having nitrogen containing basic groups selected from the class consisting of $NH_2$, NHR, $NR_2$ and $NR_3OH$ wherein R is an organic radical selected from the group consisting of aliphatic radicals having from 1 to 10 carbon atoms and aryl radicals having from 6 to 10 carbon atoms.

13. A water transfer member comprising a supporting body having a resillient surface layer adapted to effect such water transfer, said hydrophilic surface layer comprising in sufficient amount to enhance the hydrophilic and oleophobic qualities of the outer surface of said layer an organic polymeric cationic exchange resin which, prior to formation as said surface layer, is water-insoluble, said resin having reactive acid groups and being substantially chemically inert except for such groups.

14. The water-transfer member of claim 13 wherein the acid groups of said cationic exchange resin are selected from the group consisting of carboxyl, sulfonic, and phosphoric acid groups.

15. The water transfer member of claim 13 in which said cationic exchange resin consists essentially of an aryl polymer.

16. The water-transfer member of claim 15 wherein said aryl polymer consists essentially of a polyvinyl aryl condensation product containing said acid groups.

17. In a method of providing an improved water transfer member, the steps comprising molding a surface on such member of a polymeric ion exchange resin, said resin prior to formation as said surface being water insoluble, said ion exchange resin being selected from the group consisting of organic cationic resins having reactive acid groups and water-attractive non-cellulosic anionic exchange amine resins having nitrogen containing basic groups selected from the class consisting of $NH_2$, NHR, $NR_2$ and $NR_3OH$ wherein R is an organic radical selected from the group consisting of aliphatic radicals having from 1 to 10 carbon atoms and aryl radicals having from 6 to 10 carbon atoms.

18. A water transfer member comprising a supporting body having a surface adapted to effect such water transfer, said surface comprising in sufficient amount to enhance the hydrophilic and oleophobic qualities thereof, a water attractive polymeric cationic exchange resin consisting essentially of an aryl polymer containing reactive acid groups, said aryl polymer consisting essentially of a condensation product of a phenol and an aldehyde and said acid groups being nuclear with respect to the aromatic chain of the condensation product and being selected from the group consisting of carboxyl, sulfonic and phosphoric acid groups.

References Cited

UNITED STATES PATENTS

| | | | |
|---|---|---|---|
| 2,186,946 | 1/1940 | Wood | 101—457 |
| 2,302,037 | 11/1942 | Kollek | 101—395 X |
| 2,681,310 | 6/1954 | Wood | 204—38 |

DAVID KLEIN, Primary Examiner

U.S. Cl. X.R.

101—147, 148